(12) United States Patent
Tsai (10) Patent No.: US 11,353,563 B2
(45) Date of Patent: Jun. 7, 2022

(54) AVALANCHE DIODE BASED OBJECT DETECTION DEVICE

(71) Applicant: PixArt Imaging Inc., Hsin-Chu County (TW)

(72) Inventor: Tso-Sheng Tsai, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 808 days.

(21) Appl. No.: 16/129,804

(22) Filed: Sep. 13, 2018

(65) Prior Publication Data

US 2020/0088843 A1    Mar. 19, 2020

(51) Int. Cl.
  *G01S 7/487*    (2006.01)
  *G01S 7/4865*   (2020.01)
  *G01S 17/04*    (2020.01)

(52) U.S. Cl.
  CPC ............ *G01S 7/487* (2013.01); *G01S 7/4865* (2013.01); *G01S 17/04* (2020.01)

(58) Field of Classification Search
  CPC ...... G01S 7/487; G01S 7/4816; G01S 7/4861; G01S 7/4876; G01S 17/10; G01S 17/04; G01S 7/4865; G01C 3/08
  See application file for complete search history.

(56) References Cited

U.S. PATENT DOCUMENTS

| | | | |
|---|---|---|---|
| 2016/0119983 A1* | 4/2016 | Moore | H05B 6/687 219/707 |
| 2018/0128921 A1* | 5/2018 | Mattioli Della Rocca | G01S 17/32 |
| 2019/0293771 A1* | 9/2019 | Sato | G01S 7/487 |
| 2021/0075980 A1* | 3/2021 | Lajevardi | H04N 5/36965 |

FOREIGN PATENT DOCUMENTS

CN    103207024 A    7/2013

* cited by examiner

*Primary Examiner* — Luke D Ratcliffe
(74) *Attorney, Agent, or Firm* — Hauptman Ham, LLP (57) ABSTRACT

There is provided an object detection device including a light source, an avalanche diode, a first counter, a second counter and a processor. The light source emits light within a first interval, and is turned off within a second interval, a third interval and a fourth interval. The avalanche diode detects photons corresponding to the first interval, second, third and fourth intervals to trigger avalanche events. The first counter performs up-counting on the avalanche events in the first interval and performs down-counting on the avalanche events in the third interval to generate a first count value. The second counter performs up-counting on the avalanche events in the second interval and performs down-counting on the avalanche events in the fourth interval to generate a second count value. The processor calculates a time-of-flight according to the first count value and the second count value.

5 Claims, 6 Drawing Sheets

AVALANCHE DIODE BASED OBJECT DETECTION DEVICE

BACKGROUND

1. Field of the Disclosure

This disclosure generally relates to an optical object detection device and, more particularly, to an object detection device for calculating a time-of-flight according to a count value for counting avalanche events of an avalanche diode.

2. Description of the Related Art

Nowadays, the optical distance detection device generally adopts the imaging technique based on a CCD image sensor or a CMOS image sensor. The method of calculating an object distance according to a shifted time from a light beam emitted from a light source, reflected by an object and finally received by an image sensor is referred to the time-of-flight technique.

In processing light signals in a weak light environment and having a high frequency, the single photon detection is another choice.

For example, a single photon avalanche diode (SPAD) is used as an indicator of reflected light. When a photon is received by the SPAD, an avalanche current is triggered in response that one photon is detected. The pulse caused by the avalanche current is considered an event.

However, an operation environment of a distance detection device generally exists both light source signals and ambient light, and thus in addition to avalanche events triggered by the light source signals, avalanche events are also triggered by the ambient light to cause noises thereby degrading the detection accuracy.

Furthermore, when the intensity of ambient light has alternative variation, the detection result can also be affected.

Accordingly, it is necessary to provide an avalanche diode based object detection device which is capable of eliminating ambient light influence.

SUMMARY

The present disclosure provides an object detection device that adopts an avalanche diode and the time-of-flight technique.

The present disclosure further provides an object detection device that calculates an object distance and eliminates environment noises by only counting a number of occurring times of the avalanche current.

The present disclosure provides an object detection device including a light source, an avalanche diode, a first counter, a second counter and a processor. The light source is configured to emit light toward an object within a first interval, and to be turned off within a second interval, a third interval and a fourth interval. The avalanche diode is configured to expose corresponding to the first interval, the second interval, the third interval and the fourth interval to generate electrical pulses. The first counter is configured to perform up-counting on the electrical pulses in the first interval and then perform down-counting on the electrical pulses in the third interval to generate a first count value. The second counter is configured to perform up-counting on the electrical pulses in the second interval and then perform down-counting on the electrical pulses in the fourth interval to generate a second count value. The processor is configured to calculate a time-of-flight according to the first count value and the second count value.

The present disclosure further provides an object detection device including a light source, a sensor array, a plurality of first counters, a plurality of second counters and a processor. The light source is configured to emit light toward an object within a first interval, and to be turned off within a second interval, a third interval and a fourth interval. The sensor array has a plurality of avalanche diodes arranged in a matrix. The avalanche diodes are configured to expose corresponding to the first interval, the second interval, the third interval and the fourth interval to generate electrical pulses. Each first counter corresponds to one of the plurality of avalanche diodes and is configured to perform up-counting on the electrical pulses generated by a corresponding avalanche diode thereof in the first interval and then perform down-counting on the electrical pulses generated by the corresponding avalanche diode thereof in the third interval to generate a first count value. Each second counter corresponds to one of the plurality of avalanche diodes and is configured to perform up-counting on the electrical pulses generated by a corresponding avalanche diode thereof in the second interval and then perform down-counting on the electrical pulses generated by the corresponding avalanche diode thereof in the fourth interval to generate a second count value. The processor is configured to calculate a time-of-flight of each avalanche diode according to the first count value and the second count value associated with the each avalanche diode.

The present disclosure further provides an object detection device including a light source, an avalanche diode and two counters. The light source is configured to be turned on or turned off. The avalanche diode is configured to perform a bright exposure corresponding to the light source being turned on, and perform a dark exposure corresponding to the light source being turned off to generate electrical pulses. Each of the two counters has multiple stages of counting units, wherein the electrical pulses generated within an interval of the bright exposure of the avalanche diode are inputted to a first stage of the counting units, and the electrical pulses generated within an interval of the dark exposure of the avalanche diode are switched to be inputted to other counting units behind the first stage of the counting units.

The present disclosure further provides an object detection device including a light source, an avalanche diode, a first counter, a second counter and a processor. The light source is configured to emit light toward an object within a first interval, and to be turned off within a second interval, a third interval and a fourth interval. The avalanche diode is configured to expose corresponding to the first interval, the second interval, the third interval and the fourth interval to generate electrical pulses. The first counter is configured to count the electrical pulses in the first interval and in the third interval to generate a first count value. The second counter is configured to count the electrical pulses in the second interval and in the fourth interval to generate a second count value. The processor is configured to process the first count value and the second count value to calculate a time-of-flight or a distance between the object and the object detection device.

In the object detection device of the present disclosure, event counts of avalanche current are considered an energy accumulation, and a count ratio that represents a phase shift is calculated directly according to the event counts. The count ratio is further converted to a time-of-flight using a modulation frequency.

In the object detection device of the present disclosure, energy of ambient light is also indicated by event counts. The influence of ambient light is eliminated by removing event counts triggered only by ambient light from event counts triggered by both the light source signal and the ambient light.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
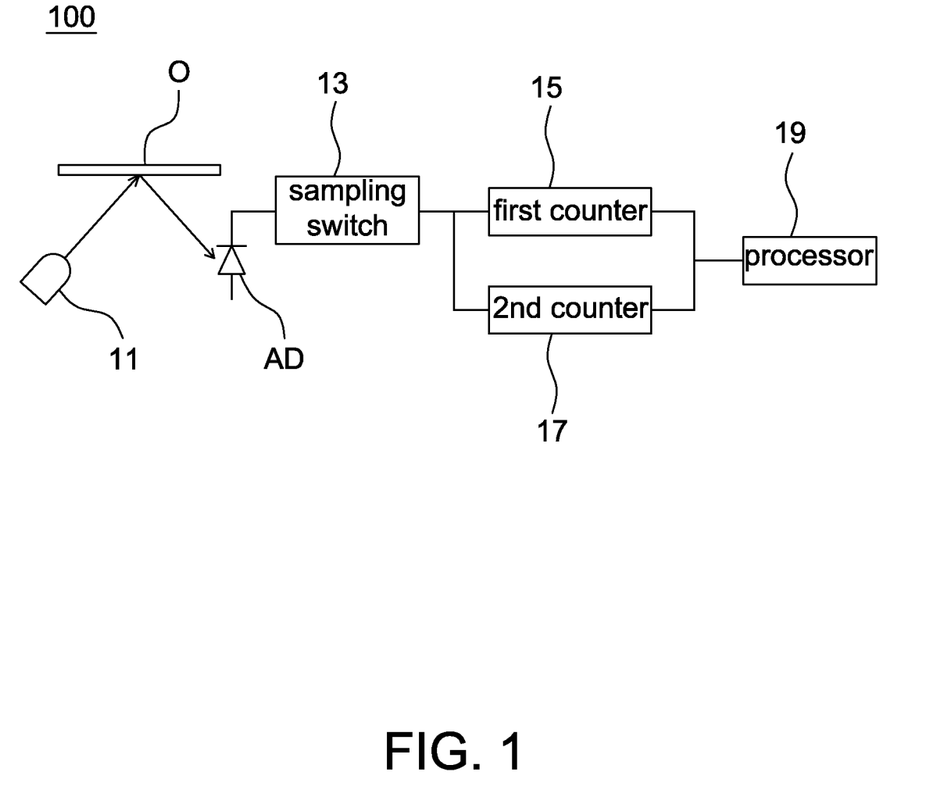
FIG. 1 is a schematic block diagram of an object detection device according to one embodiment of the present disclosure.

Referring to FIG. 1, it is a schematic block diagram of an object detection device 100 according to one embodiment of the present disclosure. The object detection device 100 is used to calculate a propagation time of light according to accumulated count values of avalanche events, which are respectively counted by two counters, within exposure intervals of a light sensor. As the velocity of light is a known value, the object detection device 100 calculates a distance of the object O from the object detection device 100 (more specifically from a light sensor thereof) according to the calculated propagation time.

As shown in FIG. 1, the object detection device 100 includes a light source 11, a light sensor (e.g., an avalanche diode AD herein), a sampling switch 13, a first counter 15, a second counter 17 and a processor 19.

Figure 2:
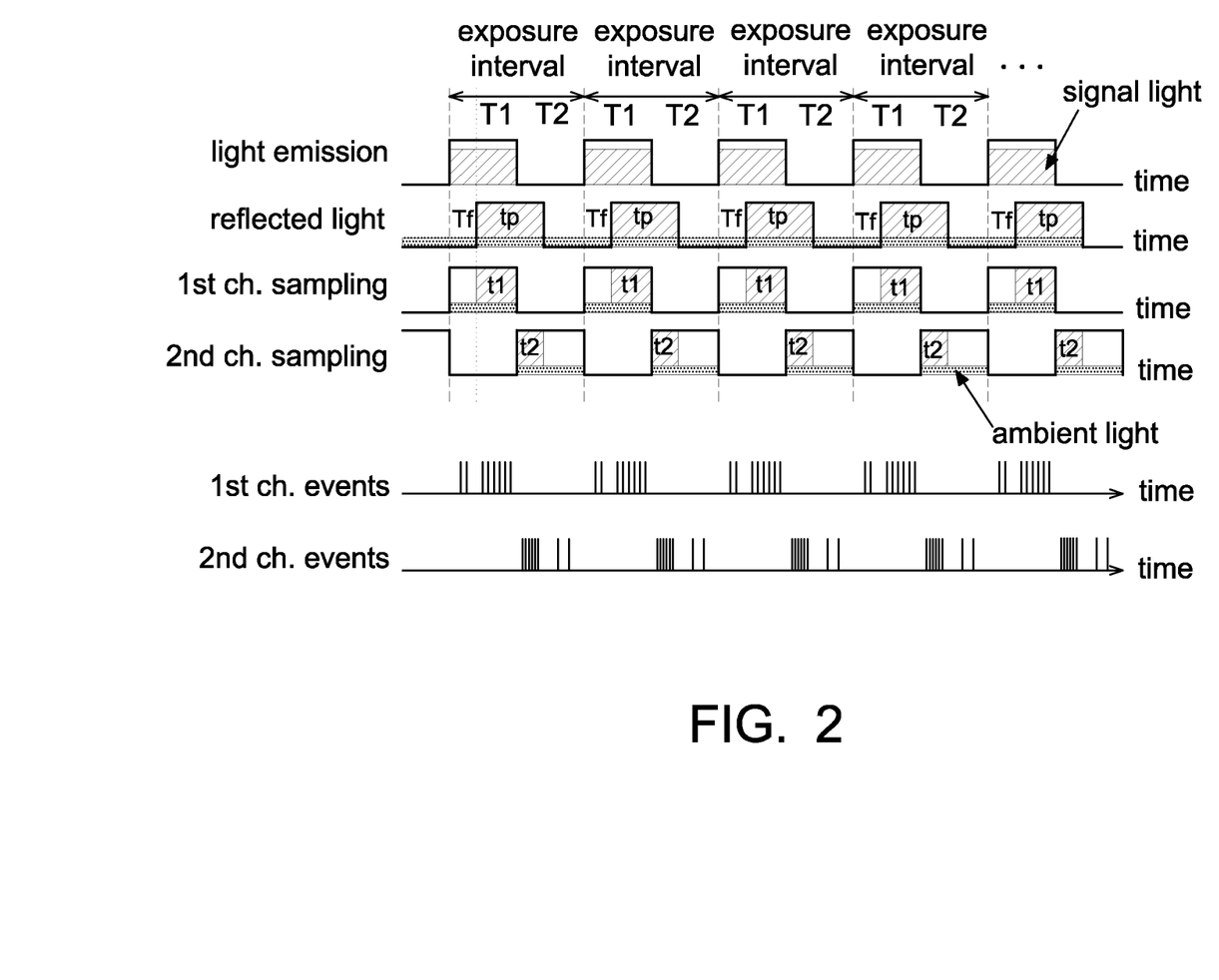
FIG. 2 is an operational schematic diagram of an object detection device according to a first embodiment of the present disclosure.

Referring to FIG. 2, one example of the object detection device 100 according to a first embodiment of the present disclosure is illustrated hereinafter.

The light source 11 is a laser diode (LD), e.g., VCSEL. The light source 11 emits light toward an object O with an identifiable spectrum (e.g., red light and/or infrared light), wherein the object O is any object within a detectable distance of the object detection device 100 without particular limitations as long as the object O reflects the light emitted by the light source 11. For example, FIG. 2 shows that the light source 11 is turned on to emit light within a first interval T1 and turned off within a second interval T2, and the light source 11 operates repeatedly in this way. For example, one exposure interval=T1+T2.

FIG. 2 shows that after the light source 11 is turned on to emit light, the emitted light reaches the avalanche diode AD after being reflected by the object O by a time interval Tf. The avalanche diode AD is, for example, a single photon avalanche diode (SPAD). It is appreciated that each time the SPAD receives or detects one photon, one avalanche current (or referred to an avalanche event) is triggered to generate an electrical pulse, e.g., a current pulse. The object detection device 100 of the present disclosure uses a number of occurrence times of this avalanche events within a predetermined time (e.g., the first interval T1 and the second interval T2) to calculate a time-of-flight (TOF), and further to calculate a distance of the object O accordingly. It is appreciated that a length of Tf is determined according to the object distance, and thus lengths of t1 and t2 are also influenced.

The sampling switch 13 is a switching device or a multiplexer, and used to conduct the avalanche diode AD with the first counter 15 in the first interval T1 to cause the first counter 15 to sample the avalanche diode AD (e.g., referred to a first channel herein). The sampling switch 13 is further used to conduct the avalanche diode AD with the second counter 17 in the second interval T2 to cause the second counter 17 to sample the avalanche diode AD (e.g., referred to a second channel herein).

The sampling herein is referred to count the avalanche events, e.g., in an interval t1, the avalanche diode AS receives light energy of both the light source signal and ambient light, and thus the first counter 15 counts a higher count value, which includes avalanche current pulses triggered by both the light source signal and ambient light. Whereas, in an interval Tf, the avalanche diode AS receives light energy of only ambient light, and thus the first counter 15 counts a lower count value, which includes avalanche current pulses triggered by only ambient light. FIG. 2 also shows events of the second channel, a period with dense events indicates both the light source signal and ambient light exists, and a period with sparse events indicates only ambient light exists.

The first counter 15 and the second counter 17 are asynchronous counters such as ripple counters.

A number of avalanche events within a predetermined time (e.g., a first interval T1) of the first channel is theoretically indicated by equation (1):

$$CN1 = t_1 \times FF \times PDP \times (P_{LD}/E_{ph}) + t_p \times FF \times PDP \times (P_{AMB}/E_{ph}) \quad (1),\text{ and}$$

a number of avalanche events within a predetermined time (e.g., a second interval T2) of the second channel is theoretically indicated by equation (2):

$$CN2 = t_2 \times FF \times PDP \times (P_{LD}/E_{ph}) + t_p \times FF \times PDP \times (P_{AMB}/E_{ph}) \quad (2),$$

wherein, FF is referred to a fill factor of the avalanche diode AD, PDP is referred to a photon detection probability, $P_{LD}$ is referred to received energy of the light source signal, $P_{AMB}$ is referred to received energy of the ambient light, and $E_{ph}$ is photon energy. In the present disclosure, a time-of-flight is defined by an equation (3):

$$TOF1 = (1/2f_{mod}) \times (CN2/(CN1+CN2)) \quad (3),$$

wherein, $f_{mod}$ is referred to a modulation frequency of the light source 11, a sampling frequency of the first channel or a sampling frequency of the second channel. Practically, CN1 and CN2 are detected by the first counter 15 and the second counter 17, respectively.

As the velocity of light is a known value, the processor 19 calculates a distance or a depth of the object O from the object detection device 100 according to TOF1 (which is associated with Tf).

It is seen from equations (1) to (3) that TOF1 is affected by ambient light due to the existence of the ambient light energy $P_{AMB}$. Meanwhile, as the PDPs of every avalanche diode AD are different from one another, in a sensor array including a plurality of avalanche diodes, the detected energy is different from pixel to pixel to cause a distance ambiguity.

To reduce the influence from ambient light, the differential operation between bright exposures and dark exposures is performed. For example referring to FIG. 3, it is an operational schematic diagram of an object detection device according to a second embodiment of the present disclosure, which is also adaptable to the object detection device 100 in FIG. 1.

Figure 3:
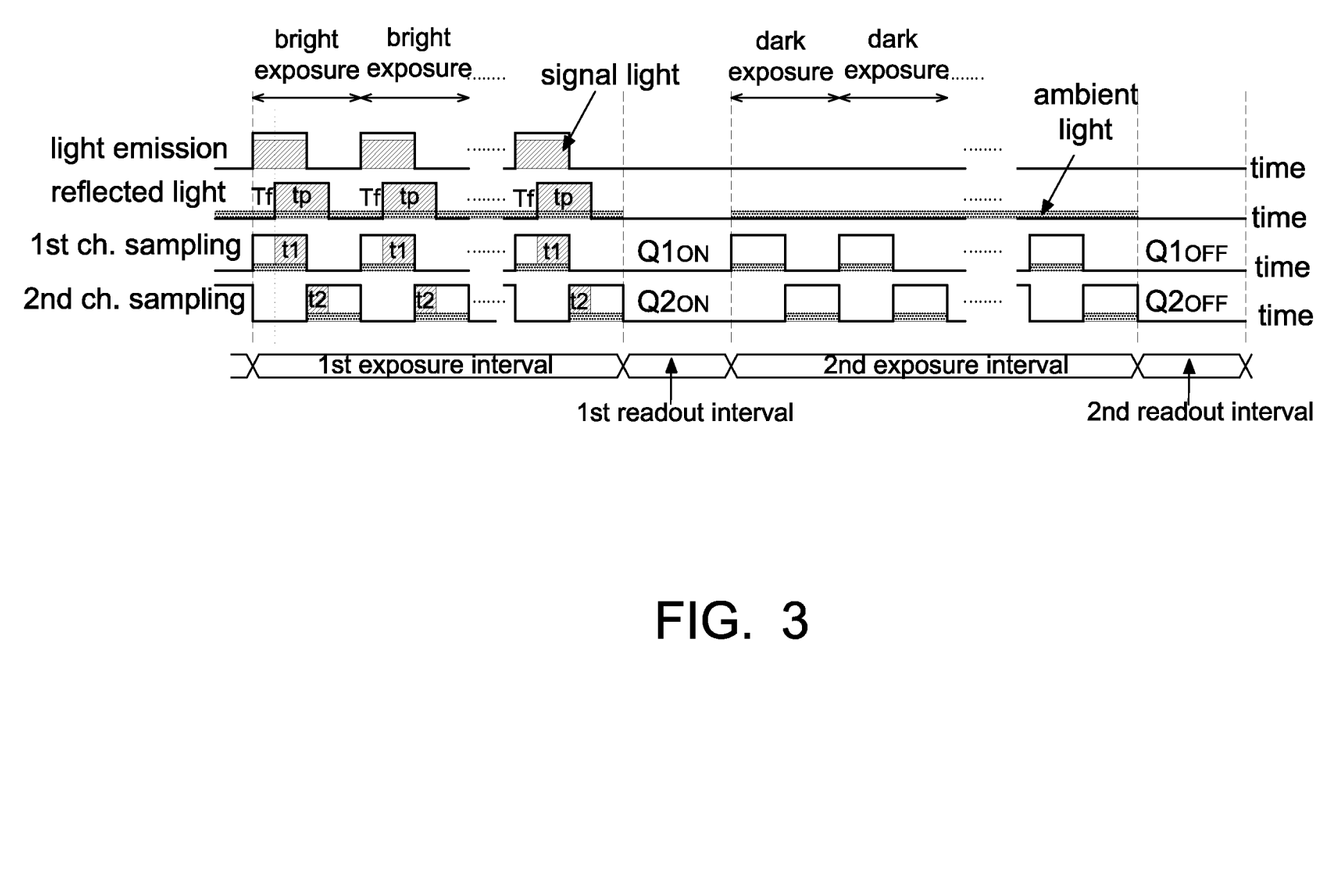
FIG. 3 is an operational schematic diagram of an object detection device according to a second embodiment of the present disclosure.

In the embodiment of FIG. 3, a first exposure interval includes a plurality of bright exposures, and the operation of each bright interval is identical to that of one exposure interval (T1+T2) in FIG. 2, and thus FIG. 3 omits the timing diagram of events. Accordingly, in the first exposure interval, the first counter 15 accumulates a first count value $Q1_{ON}$ which is N times of avalanche events of the first channel in one exposure interval of FIG. 2, e.g., $Q1_{ON}=N\times CN1$ (referring to equation 1). Similarly, the second counter 17 accumulates a second count value $Q2_{ON}$ which is N times of avalanche events of the second channel in one exposure interval of FIG. 2, e.g., $Q2_{ON}=N\times CN2$ (referring to equation 2). The processor 19 reads the first count value $Q1_{ON}$ and the second count value $Q2_{ON}$ in the first readout interval to be store in a memory (not shown) of the object detection device 100.

Next, in a second exposure interval, instead of the light source 11 being turned off, operations of the sampling switch 13, the first counter 15 and the second counter 17 are identical to those in the first exposure interval. As the light source 11 is not turned on in the second exposure interval, each exposure herein is referred to a dark exposure. Similarly, after N times of dark exposures, the first counter 15 accumulates a third count value $Q1_{OFF}$, which is N times of avalanche events of the first channel in one dark exposure interval, and the second counter 17 accumulates a fourth count value $Q2_{OFF}$, which is N times of avalanche events of the second channel in one dark exposure interval.

In this embodiment, a value of N is previously determined according to expected values of the first count value $Q1_{ON}$, the second count value $Q2_{ON}$, the third count value $Q1_{OFF}$ and the fourth count value $Q2_{OFF}$ as well as a detectable distance of the object detection device 100. The third count value $Q1_{OFF}$ is used to eliminate the influence of ambient light from the first count value $Q1_{ON}$. The fourth count value $Q2_{OFF}$ is used to eliminate the influence of ambient light from the second count value $Q2_{ON}$.

Similarly, according to equation (3), a time-of-flight of the second embodiment is defined as equation (4):

$$TOF2=(1/2f_{mod})\times(Q2_{ON}-Q2_{OFF})/((Q1_{ON}-Q1_{OFF})+(Q2_{ON}-Q2_{OFF})) \quad (4)$$

Similarly, the processor 19 calculates a distance or a depth of the object O from the object detection device 100 according to TOF2.

In FIG. 3, although noises caused by the ambient light is eliminated by the differential operation between bright exposures and dark exposures (referring to equation 4), the first exposure interval passes N times of bright exposures and the second exposure interval passes N times of dark exposures, the denoising effect is degraded when the intensity of ambient light changes with time.

Figure 4:
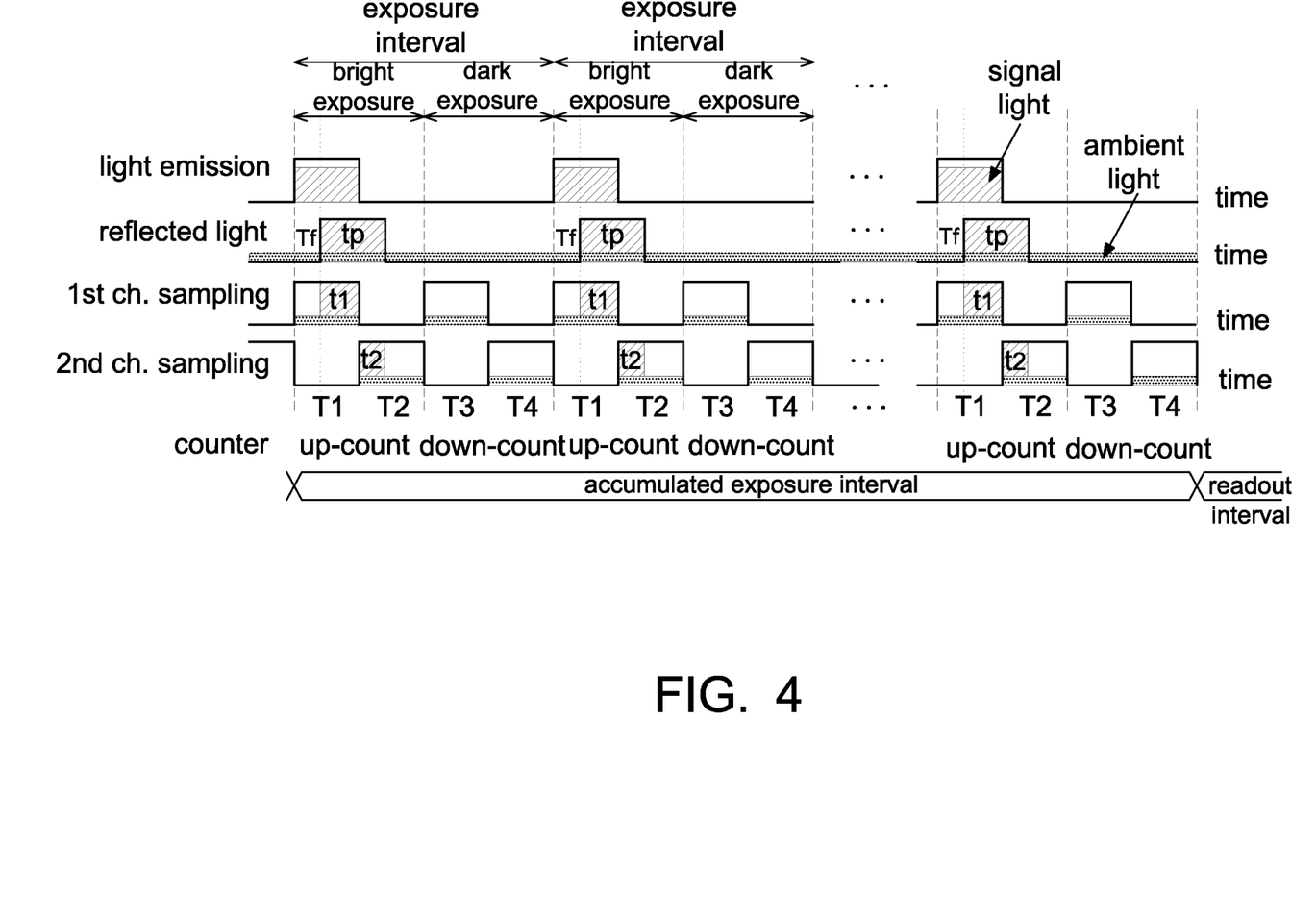
FIG. 4 is an operational schematic diagram of an object detection device according to a third embodiment of the present disclosure.

Referring to FIG. 4, it is an operational schematic diagram of an object detection device according to a third embodiment of the present disclosure, which is also implemented by the object detection device 100 of FIG. 1. The difference between FIG. 3 and FIG. 4 is that in FIG. 4, bright exposures and dark exposures are arranged adjacent to each other to further reduce the influence of time-changed ambient light.

As shown in FIG. 4, the light source 11 is turned on to emit light toward the object O within a first interval T1, and is turned off in a second interval T2, a third interval T3 and a fourth interval T4. In this embodiment, the first interval T1, the second interval T2, the third interval T3 and the fourth interval T4 form one exposure interval, e.g., one exposure interval=T1+T2+T3+T4, and T1 to T4 are preferably the same. As the first sampling channel detects the energy of light source signal in the first time interval T1, and the second sampling channel detects the energy of light source signal in the second time interval T2, the first interval T1 and the second interval T2 are referred to bright exposures herein, e.g., a bright exposure interval=T1+T2. On the other hand, as the first sampling channel does not detect the energy of light source signal in the third time interval T3, and the second sampling channel does not detect the energy of light source signal in the fourth time interval T4, the time interval T3 and the fourth time interval T4 are referred to dark exposures herein, e.g., a dark exposure interval=T3+T4.

The avalanche diode AD is exposed corresponding to the first interval T1, the second interval T2, the third interval T3 and the fourth interval T4 to receive photons and generate electrical pulses.

The sampling switch 13 conducts the avalanche diode AD to the first counter 15 within the first interval T1 and the third interval T3 to cause the first counter 15 to count the electrical pulses generated by the avalanche diode AD in the first interval T1 and in third interval T3 to generate a first count value. In this embodiment, the first counter 15 is used to perform up-counting (e.g., a count value added by 1 when one pulse being detected) on the electrical pulses in the first interval T1, and then perform down-counting (e.g., the count value decreased by 1 when one pulse being detected) on the electrical pulses in the third interval T3 to generate a first count value. In other words, the first counter 15 includes an up-counter and a down-counter or includes a counter capable of preforming both the up-counting and down-counting without particular limitations as long as a counting direction is changeable when receiving a control signal from the processor 19. In this embodiment, a final count value of the first counter 15 is not reset at the end of the first interval T1, and the final count value of the first interval T1 is decreased (i.e. down-counting) after entering the third interval T3. The down-counting in the third interval T3 is considered to remove electrical pulses triggered by ambient light from the first interval T1, and used as a method to eliminate ambient light influence.

Similarly, the sampling switch 13 conducts the avalanche diode AD to the second counter 17 within the second interval T2 and the fourth interval T4 to cause the second counter 17 to count the electrical pulses generated by the avalanche diode AD in the second interval T2 and in the fourth interval T4 to generate a second count value. In this embodiment, the second counter 17 is used to perform up-counting (e.g., a count value added by 1 when one pulse being detected) on the electrical pulses in the second interval T2, and then perform down-counting (e.g., the count value decreased by 1 when one pulse being detected) on the electrical pulses in the fourth interval T4 to generate a second count value. The second counter 17 is selected to be identical to the first counter 15. Similarly, a final count value of the second counter 17 is not reset at the end of the second interval T2, and the final count of the second interval T2 is decreased (i.e. down-counting) after entering the fourth interval T4. The down-counting in the fourth interval T4 is considered to remove electrical pulses triggered by ambient light from the second interval T2, and used as a method to eliminate ambient light influence.

The first count value obtained at the end of the third interval T3 and the second count value obtained at the end of the fourth interval T4 are the result by eliminating ambient light influence, and further differential operation or subtraction operation is no longer necessary.

The processor 19 processes the first count value and the second count value to calculate a time-of-flight or a distance between the object O and the object detection device 100. For example, the processor 19 calculates the time-of-flight according to the first count value and the second count value based on the concept of equation (3). Similarly, the first count value with a predetermined interval (e.g., one exposure interval) is indicated by equation (5) based on the concept of equation (1):

$$CN1=(t_1 \times FF \times PDP \times P_{LD}/E_{ph}+tp \times FF \times PDP \times P_{AMB}/E_{ph})-(tp \times FF \times PDP \times P_{AMB}/E_{ph}) \quad (5)$$

Similarly, based on the concept of equation (2), the second count value in a predetermined interval (e.g., one exposure interval) is indicated by equation (6):

$$CN2=(t_2 \times FF \times PDP \times P_{LD}/E_{ph}+tp \times FF \times PDP \times P_{AMB}/E_{ph})-(tp \times FF \times PDP \times P_{AMB}/E_{ph}) \quad (6)$$

The time-of-flight is calculated based on equation (3).

As mentioned above, as both equations (5) and (6) contain a probability parameter PDP, the processor 19 preferably accumulates the first count value CN1 and the second count value CN2 for a plurality of exposure intervals within an accumulated exposure interval, and a number of the plurality of exposure intervals is determined according to expected values of the first count value and the second count value as well as a detectable distance of the object detection device 100. Finally, after N times of the first count value CN1 and N times of the second count value CN2 are read in a readout interval, the time-of-flight is calculated based on equation (3).

As mentioned above, after the time-of-flight is obtained, the processor 19 further calculates a distance or a depth of the object O according to the calculated time-of-flight value.

In the above embodiment, one avalanche diode AD is taken as an example for illustration. In other embodiments, the object detection device 100 includes a sensor array having a plurality of matrix arranged avalanche diodes AD to expose corresponding to the first interval T1, the second interval T2, the third interval T3 and the fourth interval T4 to generate electrical pulses by every AD.

In this case, the object detection device 100 includes a plurality of first counters 15, each corresponding to one of the plurality of avalanche diodes AD. Each first counter 15 is used to perform up-counting on the electrical pulses generated by a corresponding avalanche diode AD thereof in the first interval T1 and then perform down-counting on the electrical pulses generated by the corresponding avalanche diode AD thereof in the third interval T3 to generate a first count value, e.g., CN1. The object detection device 100 further includes a plurality of second counters 17, each corresponding to one of the plurality of avalanche diodes AD. Each second counter 17 is used to perform up-counting on the electrical pulses generated by a corresponding avalanche diode AD thereof in the second interval T2 and then perform down-counting on the electrical pulses generated by the corresponding avalanche diode AD thereof in the fourth interval T4 to generate a second count value, e.g., CN2.

In this embodiment, the operation of each avalanche diode AD has been described above and shown in FIG. 4, and thus details thereof are not repeated herein.

The processor 19 calculates a time-of-flight of each avalanche diode AD according to the first count value CN1 and the second count value CN1 associated with the each avalanche diode AD, and thus multiple time-of-flight values are obtained.

The processor 19 further calculates a depth map (or referred to 3D image) of the object O according to the multiple time-of-flight values of the plurality of avalanche diodes AD.

In this embodiment, each avalanche diode AD is arranged corresponding to one sampling switch 13. Each sampling switch 13 is used to conduct the avalanche diode AD with a corresponding first counter 15 in the first interval T1 and the third interval T3 to cause the first counter 15 to count the electrical pulses generated by the avalanche diode AD. Each sampling switch 13 is used to conduct the avalanche diode AD with a corresponding second counter 17 in the second interval T2 and the fourth interval T4 to cause the second counter 17 to count the electrical pulses generated by the avalanche diode AD.

When ambient light has AC frequency (e.g., the frequency of power system), it is possible to form a filter-like effect using count values of the counters to reduce the influence of said AC frequency.

Figure 5:
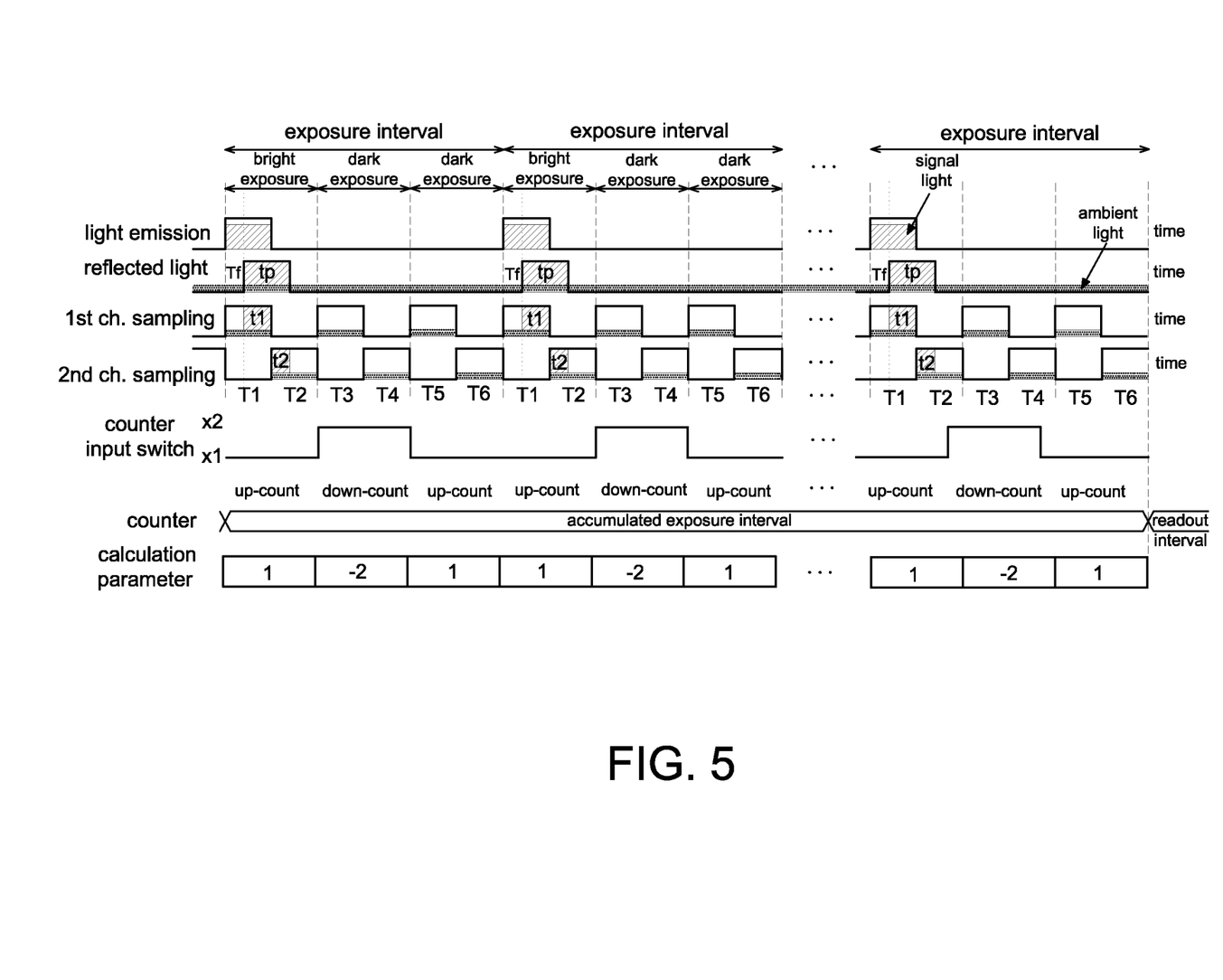
FIG. 5 is an operational schematic diagram of an object detection device according to a fourth embodiment of the present disclosure.

Referring to FIG. 5, it is an operational schematic diagram of an object detection device according to a fourth embodiment of the present disclosure, which is also implemented by the object detection device 100 in FIG. 1. As mentioned above, the object detection device 100 includes a light source 11 used to be turned on or turned off, e.g., controlled by the processor 19. The avalanche diode AD is used to perform a bright exposure to generate electrical pulses corresponding to the light source 11 being turned on, and performs a dark exposure to generate electrical pulses corresponding to the light source being turned off. In the present disclosure, an interval of the bright exposure is not referred to that the light source 11 is turned on continuously in the whole interval, but is referred to that the light source 11 is turned on at least a part of the interval thereof. An interval of the dark exposure is referred to that the light source 11 is not turned on at all therein.

Figure 7:
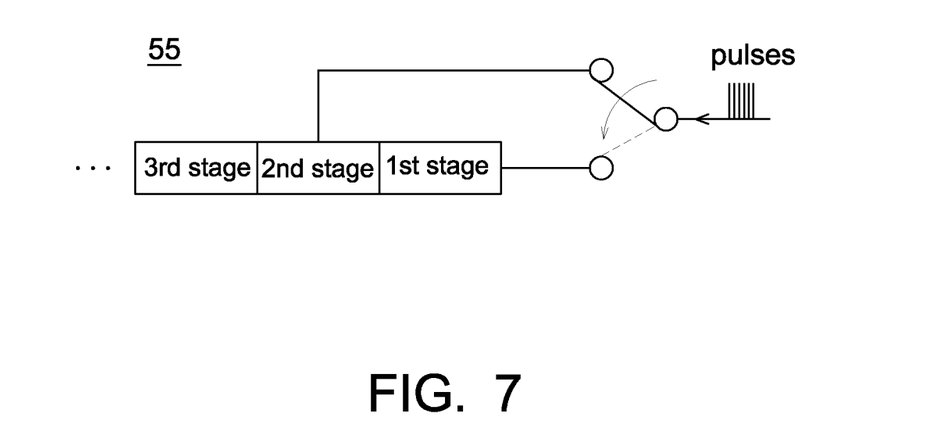
FIG. 7 is a schematic diagram of the switching control to connect a counter of an object detection device according to the fourth embodiment of the present disclosure.

As mentioned above, the first counter 15 and the second counted 17 are ripple counters. It is appreciated that a ripple counter includes multiple cascaded D flip-flops as multiple stages of counting units, as shown by element 55 in FIG. 7, wherein a number of the multiple stages is determined according to values to be counted. The electrical pulses generated by the avalanche diode AD within an interval of the bright exposure are inputted to a first stage of the multiple counting units, and the electrical pulses generated by the avalanche diode AD within an interval of the dark exposure are switched (e.g., by a switching device or a multiplexer) to be inputted to other counting units behind the first stage of the multiple counting units, i.e. bypassing the first stage counting unit. In addition, a sampling switching 13, as shown in FIG. 1, is also used to connect the avalanche diode AD to one of the first counter 15 and the second counter 17 to cause the first counter 15 or the second counter 17 to count electrical pulses generated by the avalanche diode AD.

Figure 6:
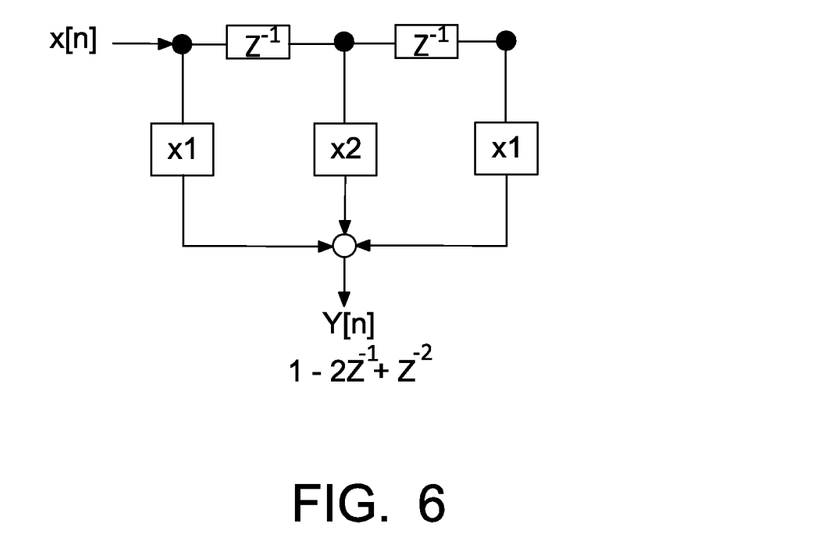
FIG. 6 is a schematic diagram of a filter transfer function of an object detection device according to the fourth embodiment of the present disclosure.

FIG. 6 is a schematic diagram of a transfer function of a two-order filter. Referring to FIG. 5 again, if it is desired to implement the transfer function shown in FIG. 6, each exposure interval contains an interval of one bright exposure (e.g., T1+T2) and intervals of two dark exposures (e.g., T3+T4 and T5+T6). It is appreciated that different transfer functions correspond to different operations, and is not limited to that shown in FIG. 5 as long as one exposure interval contains one bright exposure interval and multiple dark exposure intervals. The transfer function is determined according to an AC frequency of ambient light to be removed.

In FIG. 5, in an interval T1 of the bright exposure, the electrical pulses are inputted to a first stage counting unit of the first counter 15 to perform an up-counting on avalanche events of the first channel After the bright exposure is over, a counted value of the first counter 15 is not reset. In an interval T3 of a first dark exposure, the electrical pulses are inputted to a second stage counting unit of the first counter 15 to perform a down-counting, which counts down from a counted value at the end of the interval T1 of the bright exposure, on avalanche events of the first channel After the first dark exposure is over, a counted value of the first counter 15 is still not reset. In an interval T5 of a second dark exposure, the electrical pulses are switched back to be inputted to the first stage counting unit of the first counter 15 again to perform an up-counting, which counts up from a counted value at the end of the interval T3 of the first dark exposure, on avalanche events of the first channel.

Similarly, in an interval T2 of the bright exposure, the electrical pulses are inputted to a first stage counting unit of the second counter 17 to perform an up-counting on avalanche events of the second channel After the bright exposure is over, a counted value of the second counter 17 is not reset. In an interval T4 of a first dark exposure, the electrical pulses are inputted to a second stage counting unit of the second counter 17 to perform a down-counting, which counts down from a counted value at the end of the interval T2 of the bright exposure, on avalanche events of the second channel. After the first dark exposure is over, a counted value of the second counter 17 is still not reset. In an interval T6 of a second dark exposure, the electrical pulses are switched back to be inputted to the first stage counting unit of the second counter 17 again to perform an up-counting, which counts up from a counted value at the end of the interval T4 of the first dark exposure, on avalanche events of the second channel.

After one exposure interval, the first counter 15 generates a first count value and the second counter 17 generates a second count value. Based on the same concept of equations (3) and (4) mentioned above, the processor 19 calculates a time-of-flight Tf according to the first count value and the second count value, and further calculate a distance of the object O accordingly.

In this embodiment, which of the up-counting and down-counting is performed is determined according to a symbol of a calculation parameter of the transfer function, e.g., a positive value inducing the up-counting and a negative value inducing the down-counting, or vice versa. The stage of the multiple counting units to which the electrical pulses are inputted is determined according to a value of a calculation parameter of the transfer function, e.g., value 1 switching an input to a first stage, value 2 switching an input to a second stage, value 4 switching an input to a third stage, and so on.

Similarly, to allow the first count value and the second count value to reach expected values, the processor 19 does not reset (e.g., to zero) the first count value and the second count value at the end of each exposure interval, and continuously to accumulate the first count value the second count value of multiple exposure intervals to the end of the accumulated exposure interval. Or, the processor 19 stores the first count value and the second count value to a memory at the end of each exposure interval and reset the first count value and the second count value to zero. Then, the processor 19 accumulates a predetermined times of the first count value and the second count value to the stored value in the memory. As mentioned above, a number of the plurality of exposure intervals to be accumulated is determined according to the expected values and a detectable distance of the object detection device 100.

As mentioned above, although the SPAD can be used to detect extremely weak light and high frequency signals, the influence of ambient light also needs to be removed to improve the detection accuracy and reduce the distance ambiguity between pixels. Accordingly, the present disclosure further provides an object detection device (e.g., FIG. 1) that calculates a time-of-flight directly according to a count value of avalanche events of the avalanche diode, and an operating method thereof (e.g., FIGS. 2-4). The noises caused by ambient light are eliminated by calculating accumulated counts from the bright exposure to the dark exposure.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An object detection device, comprising
a light source configured to be turned on or turned off;
an avalanche diode configured to perform a bright exposure corresponding to the light source being turned on, and perform a dark exposure corresponding to the light source being turned off to generate electrical pulses;
two counters each comprising multiple stages of counting units, wherein the electrical pulses generated within an interval of the bright exposure of the avalanche diode are inputted to a first stage of the counting units, and the electrical pulses generated within an interval of the dark exposure of the avalanche diode are switched to be inputted to other counting units of the same counter behind the first stage of the counting units; and
a processor configured to calculate a time-of-flight according to count values within an exposure interval of the two counters, wherein the exposure interval comprises an interval of one bright exposure and intervals of multiple dark exposures, and the count values are results by eliminating ambient light influence without further subtraction operation in calculating the time-of-flight.

2. The object detection device as claimed in claim 1, wherein the electrical pulses generated within an interval of another dark exposure of the avalanche diode are switched back to be inputted to the first stage of the counting units.

3. The object detection device as claimed in claim 1, wherein
when the electrical pulses are inputted to the first stage of the counting units, said counting units are configured to perform an up-counting, and
when the electrical pulses are inputted to other counting units behind the first stage of the counting units, said counting units perform a down-counting.

4. The object detection device as claimed in claim 1, wherein the processor is further configured to accumulate the count values of the two counters for a plurality of exposure intervals.

5. The object detection device as claimed in claim 1, further comprising a sampling switch configured to connect the avalanche diode with one of the two counters.

* * * * *